United States Patent [19]

Juengel

[11] Patent Number: 4,545,106

[45] Date of Patent: Oct. 8, 1985

[54] MACHINE SYSTEM USING INFRARED TELEMETERING

[75] Inventor: Richard O. Juengel, Romeo, Mich.

[73] Assignee: GTE Valeron Corporation, Troy, Mich.

[21] Appl. No.: 414,734

[22] Filed: Sep. 3, 1982

Related U.S. Application Data

[63] Continuation-in-part of Ser. No. 259,257, Apr. 30, 1981, Pat. No. 4,401,945.

[51] Int. Cl.⁴ ............................................. B23Q 15/00
[52] U.S. Cl. ........................................ 29/563; 408/12; 408/13; 408/16; 409/163; 409/197; 409/220; 414/730; 901/6; 901/47
[58] Field of Search ............. 29/563, 564, 56.6, 26 A; 409/163, 197, 225, 218, 219, 220; 408/6, 7, 11, 12, 13, 16; 901/6, 7, 47, 46; 414/730; 340/652; 33/174 L; 331/65; 324/207, 208, 206, 57

[56] References Cited

U.S. PATENT DOCUMENTS

| | | | |
|---|---|---|---|
| 3,670,243 | 6/1972 | Fougere et al. | 324/57 |
| 3,831,425 | 8/1974 | Kita | 901/6 |
| 4,090,802 | 5/1978 | Bilz | 408/9 X |
| 4,118,871 | 10/1978 | Kirkham | 33/172 |
| 4,130,941 | 12/1978 | Amsbury | 33/174 |
| 4,228,886 | 10/1980 | Moran | 901/47 X |
| 4,328,623 | 5/1982 | Juengel et al. | 33/174 |
| 4,339,714 | 7/1982 | Ellis | 324/206 |
| 4,343,584 | 8/1982 | Hudgins | 901/7 X |

FOREIGN PATENT DOCUMENTS

| | | | |
|---|---|---|---|
| 88645 | 9/1983 | European Pat. Off. | 409/163 |
| 2916702 | 10/1979 | Fed. Rep. of Germany | 901/6 |

OTHER PUBLICATIONS

"Machining Cells", *Decade of Robotics*, pp. 54–55, 1983, Martins et al.

*Primary Examiner*—William R. Briggs
*Attorney, Agent, or Firm*—Harness, Dickey & Pierce

[57] ABSTRACT

Positional information about movable components in a machine system relative to the workpiece is wirelessly transmitted by infrared radiation to a remote receiver. The receiver is operative to convert the infrared signals into electrical signals for controlling operational cycles of the machine system.

17 Claims, 4 Drawing Figures

MACHINE SYSTEM USING INFRARED TELEMETERING

CROSS REFERENCE TO RELATED APPLICATION

This application is a continuation-in-part of U.S. Ser. No. 259,257 entitled Apparatus for Detecting the Position of a Probe Relative to a Workpiece filed Apr. 30, 1981, now U.S. Pat. No. 4,401,945, and having the same assignee as the present invention.

DESCRIPTION

1. Technical Field

This invention relates to machine tool systems and, more particularly, to techniques for wirelessly transmitting information utilized by machine tool systems.

2. Background Art

In automated machining systems, such as those using numerically controlled (NC) machine tools, it is necessary to provide the electronic controller with a wide variety of information relating to the status of components therein as well as the workpiece relative to the components. Traditionally, this information is provided by way of electrical signals transmitted over wires to the machine controller.

In relatively simple machines the routing of the wires may be accomplished fairly easily so that the wires do not become entangled with moving components during the machining operation. However, this task becomes increasingly burdensome in more sophisticated systems employing a large number of moving components whose status must be monitored. This is especially true for systems employing several different pieces of remotely spaced machinery cooperating to perform various steps in the operational sequence. If a robot or other automated mechanism is used to transfer workpieces from a conveyor onto a workpiece holder on an indexing table of a machining center, information must be relayed to the robot controller in order for the entire system to operate in proper sequence. For example, it is necessary to tell the robot that the tool holder is in a condition to receive a new part to be machined or to inform the robot that the machined part is ready for removal. Conventional approaches require the use of a flexible cable connected between the workpiece holder and the robot controller. The cable must be of sufficient length to follow the path of movement of the holder as it is moved by the indexing table relative to the tool in the machining center. The relatively long lengths of these cables present problems in that it is difficult to conveniently route the cable to the robot such that it does not interfere with the system operation or the user. In addition, the cable is subject to wear or breakage and special cable connectors sometimes must be used to accommodate the movement of the cable.

SUMMARY OF THE INVENTION

Pursuant to the present invention, information relating to the status of components in a machining center or the position of the workpiece relative to these components is transmitted wirelessly by way of infrared radiation to a remote receiver. The remote receiver is adapted to convert the infrared radiation into electrical signals for controlling operational sequences of the system. Infrared light transmission is advantageously used because it is not as susceptible to electromagnetic interference commonly encountered in machine system environments.

In the particular embodiment disclosed, the system includes a machining center and a robot for sequentially transporting workpieces to and from a holder mounted on a movable indexing table. The holder may take the form of a hydraulically operated vise. Two transducers connected to the vise serve to provide electrical signals indicating whether the workpiece is positioned in the vise and whether the jaws of the vise are opened or closed, respectively. These transducers are connected to the infrared transmitter which is also mounted on the vise and can move with it as the table moves the workpiece relative to a tool for machining the workpiece. The receiver is remotely mounted from the moving indexing table in a position to receive the infrared radiation from the transmitter.

The transmitter preferably includes means for alterating the characteristics of the infrared signal as a function of the transducer signals. The receiver is designed to decode the infrared radiation and generate a plurality of different electrical signals providing information to the robot controller. In the preferred embodiment, the transmitter is operative to initiate transmission of the infrared radiation upon receipt of a signal from one of the transducers whereas a signal from the other transducer causes the transmitter to shift the frequency of the infrared radiation.

Thus, by transmitting status information wirelessly the cumbersome flexible cable may be eliminated while at the same time providing the transmission of a variety of different information in a comparatively enconomical and accurate manner.

BRIEF DESCRIPTION OF THE DRAWINGS

Various other advantages to the present invention will become apparent to one skilled in the art upon reading the following specification and by reference of the drawings by which.

DESCRIPTION OF THE PREFERRED EMBODIMENT

Figure 1:
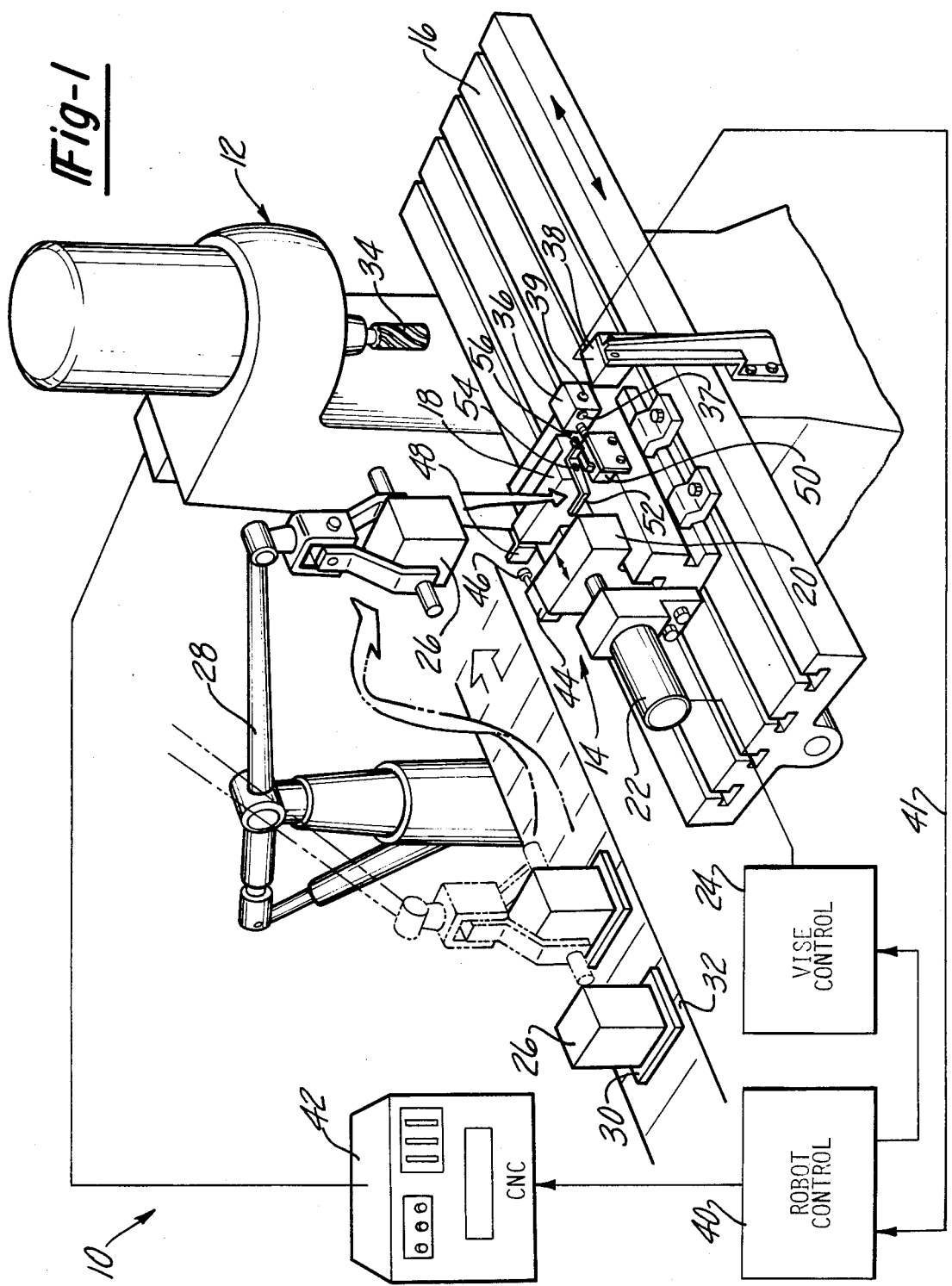
FIG. 1 is a perspective view of a machine system employing the teachings of the present invention.

FIG. 1 illustrates a machine system 10 incorporating the teachings of the present invention. System 10 includes a machining center 12 capable of performing a variety of machining operations on a workpiece such as milling, drilling, etc. An example of machining center 12 is a Monarch vertical machining center. However, a variety of other machine tools can be employed.

Machining center 12 includes a hydraulically operated vise 14 which is rigidly mounted on an indexing table 16. Vise 14 includes a fixed jaw 18 and a movable jaw 20 connected to a cylinder 22 controlled by a suitable hydraulic vise controller 24. Vise 14 is a commercially available PowRjaw Hydraulic vise in this embodiment but a variety of other workpiece holders may be employed. When the jaws of vise 14 are open it is capable of receiving a workpiece 26. In this embodiment, machine system 10 utilizes an automaton or robot 28 to automatically place workpiece 26 into the open jaws of vise 14. Workpieces 26 may be successively delivered to a station adjacent robot 28 by way of a pallet 30 riding on a movable conveyor 32.

When the workpiece 26 is in place, the jaws of vise of 14 are closed to rigidly hold the workpiece. Then, index table 16 is moved rightwardly to a position wherein tool 34 may operate on the workpiece 26. After the machining operation is finished, the table 16 may be indexed back to its home position where the jaws of the vise 16 are opened and the robot 28 may remove workpiece 26.

In order to perform the operational sequences just described, information relating to the status of the vise 14 (i.e., clamped or unclamped) and workpiece 26 (i.e., in position in the vise or not) must be relayed to robot 28 and machining center 12 in order to provide proper sequential operation. Pursuant to the present invention, this information is wirelessly transmitted by transmitter 36 as infrared radiation to receiver 38. Transmitter 36 is connected to and moves with vise 14 whereas receiver 38 is positioned at a convenient fixed location remotely spaced from the moving index table 16. In the preferred embodiment, transmitter 36 includes two light emitting diodes 37 and 39 on adjacent faces of the transmitter box housing. Diodes 37, 39 are adapted to transmit light in the infrared frequency range. The use of a plurality of diodes serves to provide a wide angle of transmitted radiation of sufficient strength that it may be picked up by the photo-receptor in the housing of the fixed receiver 38 as the transmitter 36 is moved to various positions. The output of receiver 38 is connected to a robot controller 40 which utilizes the received information to control the movement of robot 28. In addition, robot controller 40 is coupled to a computer-numerically-controlled (CNC) controller 42 and vise controller 24 to control operation of the machining center 12 and vise 14, respectively.

The position of the vise jaws is detected by a transducer 44 in the form of a microswitch having a probe 46 connected to movable jaw 14 and adapted to contact a plate 48 on the fixed jaw 18 when the jaws are clamped about the workpiece. The output of switch 44 is connected to an input of transmitter 36 by way of conventional wires. However, since the microswitch 44 and transmitter 36 move together in unison, the wire connection can be made in an unobstrusive manner.

The position of the workpiece 26 is detected by transducer 50 which is also connected to the vise supporting structure. A lever arm 52 pivoted about point 54 comes into contact with lower portions of the workpiece 26 when it is placed within the open jaws of vise 14. The opposite end of lever arm 52 is connected to a feeler probe 56 of a microswitch making up transducer 50. Thus, when lever arm 52 is pressed downwardly by the workpiece, the feeler probe 56 detects the upward motion of the opposite end of the lever resulting in the generation of an electrical signal which is coupled to another input of transmitter 36.

It should be understood that a wide variety of different transducer constructions can alternately be employed.

Figure 2:
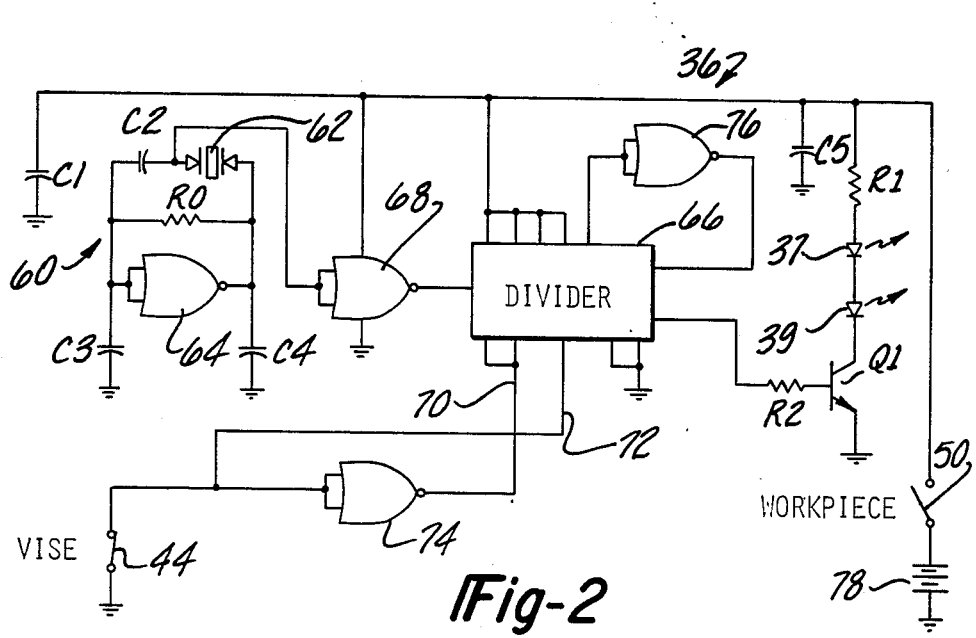
FIG. 2 is a schematic diagram of the circuitry used in the transmitter of the preferred embodiment.

FIG. 2 illustrates the circuitry used in the transmitter 36 of the preferred embodiment. An oscillator network 60 includes an interchangable crystal 62 which is adapted to oscillate at a given frequency, which in this example is 3.484 MHz. The output of oscillator network 60 is coupled to the input of a divider network 66 through inverter 68. Divider 66 is a conventional component such as a number 74HC161 which, in this embodiment, has been wired to divide the frequency from oscillator network 60 by a factor of 12 or 13, depending upon the code presented on lines 70 and 72. The code on line 70, 72 is determined by the state of microswitch 44 indicating the position of the jaws of the vise 14. For example, when the vise is closed and switch 44 is opened, divider 66 serves to divide the oscillator frequency by 13 to provide an output for driving the base of transistor Q1 at a frequency of about 267 KHz. When the vise is opened switch 44 will close presenting a different code on lines 70 and 72 causing divider 66 to divide the oscillator frequency by 12 and generate a 290 KHz drive signal to transistor Q1.

The light transmitting diodes 37 and 39 may take the form of Telefunken CQY99 light emitting diodes (LED's). The frequency applied to the base of transistor Q1 determines the frequency of the current conduction through diodes 37 and 39 and, thus, the frequency of the infrared signals emitted thereby. Infrared light transmission is advantageously employed because it is less susceptible to electromagnetic interference than radio frequency signals which must be used in a relatively short distance between the transmitter and receiver.

Workpiece detection microswitch 50 is coupled between a battery 78 and the other circuit components in the transmitter. When the workpiece is not present within vise 14, switch 50 is opened so that no light is transmitted by diodes 37, 39. When the workpiece is in place, switch 50 is closed and light is transmitted to the receiver.

The frequency of the transmitted infrared signal depends upon the condition of the vise switch 44. The present invention employs a frequency shift keying technique in which the FM infrared signals from diodes 37, 39 are shifted from a center frequency which is about 279 kilohertz, in this example. As noted before, if the vise is open and the workpiece is present the infrared transmitted signal will be shifted to a frequency of about 290 kilohertz whereas if the vise is closed and the workpiece is present the infrared signal will be shifted to a frequency of about 267 kilohertz. A particularly advantageous feature of this invention is that information about the workpiece and vise position is transmitted in a relatively simple manner using the presence or absense of signal to convey valid data as well as the modulation of the center carrier frequency. However, other techniques for altering the characteristics of the infrared signal may be employed such as pulse coded modulation.

Figure 3:
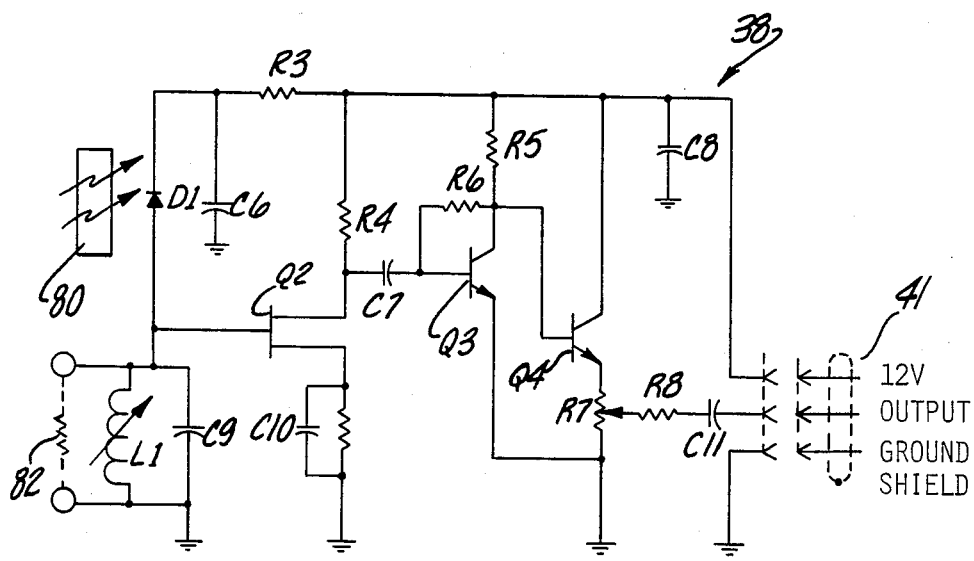
FIG. 3 is a schematic diagram of the circuitry used in the receiver of the preferred embodiment.

FIG. 3 shows the circuitry utilized in the preferred embodiment of the receiver head 38. The infrared light signals received from diodes 37 and 39 in the transmitter are optically filtered by infrared filter plate 80. The optically filtered signals are then directed to impinge upon a photo-diode D1 which, for example, may comprise a commercially available DPW-34 PIN diode.

A tank circuit comprised of a parallel combination of a variable inductor L1 and capacitor C9 is tuned to the center frequency of the received FM optical signal to provide low frequency noise immunity at the receiver head. An optical resistor 82 may also be included for tuning purposes. It should be appreciated that the tunable tank circuit allows the manufacturer to build a common receiver head which may be individually tuned to the preselected center frequencies of a variety of different transmitters. It will be remembered that this may be accomplished merely by replacing the crystal 62 of the transmitter 36 circuitry of FIG. 2 to provide different channel frequencies.

Photo-diode D1 converts the incident optical infrared light signal to an electrical signal which is coupled to a tuned input amplifier comprising field effect transistor Q2 and NPN transistor Q3. The amplified FM electrical signal is coupled from the tuned amplifier output to an emitter follower line driver circuit including transistor Q4. The amplified output at the collector electrode of transistor Q3 is coupled to base of line driver transistor Q4. The emitter output of transistor Q4 is coupled to the output line in a cable 41 connected to the robot controller 40 through potentiometer R7, resistor R8 and coupling capacitor C11.

Figure 4:
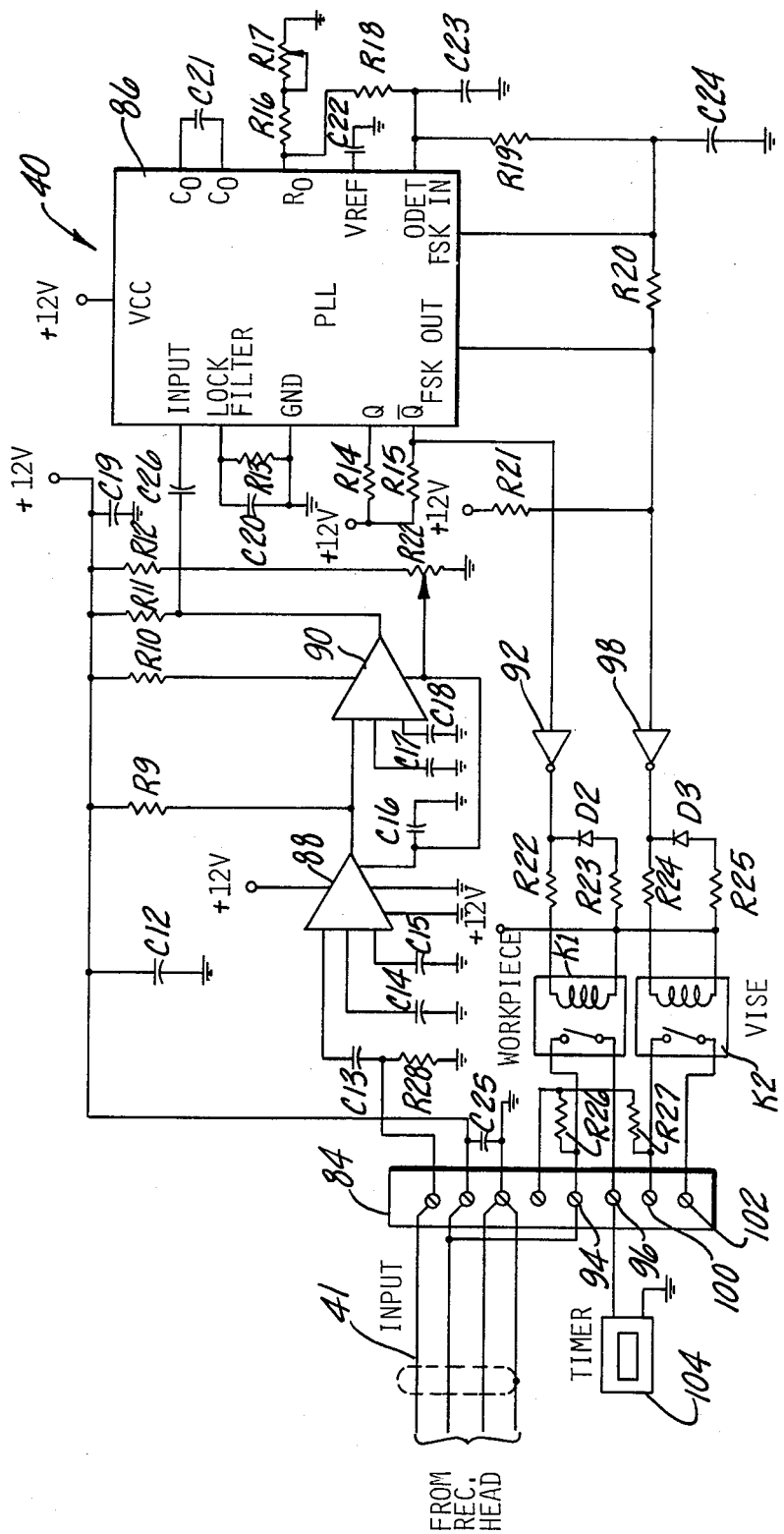
FIG. 4 is a schematic diagram of the circuitry used to decode the characteristics of alterable radiation received from the transmitter.

FIG. 4 illustrates a portion of the robot control circuitry 40 for decoding the transmitted information that has been converted to an electrical FM signal by receiver head 38. Cable 41 is connected to terminals on a connector block 84 such that the received signal is coupled to the input of phase locked loop (PLL) circuit 86 through conditioning amplifiers 88 and 90 which serve to amplify and limit the amplitude of the input signal. Phase locked loop circuit 86 in this embodiment is an XR2211 device made by EXAR, Incorporated. Capacitor C21 and the resistive-capacitive network including resistors R16–R18 and capacitor C23 are utilized to define the capture range about the center frequency associated with the received FM signals. When any frequencies within this defined range are received by PLL 86, it provides an output signal on its $\overline{Q}$ output line. It will be remembered that this condition is satisfied whenever the workpiece is in position within vise 14 causing transmission of one of the frequency shifted infrared signals to the receiver. The $\overline{Q}$ output of PLL 86 is connected to a relay K1 which is energized whenever the workpiece is in position. The output of relay K1 is connected to terminals 94 and 96 which may be connected to other components in the robot controller 40 that would use this information as an input indicating the status of the workpiece relative to the vise.

PLL 86 is also adapted to detect whether the frequency of the received signal is above or below the center frequency. This will provide an indication as to the status of the vise jaws. It will be remembered that a vise closed condition will generate a frequency of about 267 KHz (below the center frequency) and a frequency of about 290 KHz when the vise is open. The PLL output labeled "FSK OUT" will provide a signal thereon when the vise is closed. This signal is used to energize relay K2. The output of relay K2 is couple via terminals 100, 102 to other components in the robot control 40 and provides information relating to the position of the vise.

An optional feature of this invention is the provision of a timer 104 which is activated whenever the relay K1 is energized. The timer 104 thus may be utilized to display elapsed time associated with the battery usage of the transmitter. A counter (not shown) may likewise be connected to relay K2 to provide a count of the number of parts or workpieces that have been completed. If desired, the timer 104 and counter along with part present, clamped and unclamped indicators may be provided in a separate control box paralleling that coupled to robot controller 40.

Returning attention to FIG. 1, the operation of the machining system will be described. Robot 28 begins by grasping workpiece 26 on conveyor 32. The robot arm is lifted to remove workpiece 26 from pallet 30 and places the workpiece in position within the open jaws of vise 14. The workpiece contacts lever arm 52 causing transmittor 36 to radiate an infrared signal to receiver 38. The circuitry in receiver 38 converts the infrared signal to an electrical signal of corresponding frequency and sends this signal via cable 41 to robot controller 40. The PLL 86 (FIG. 4) responds by energizing relay K1 which is used by vise control 24 to clamp the vise jaws about the workpiece.

When microswitch 44 is energized, the frequency of the radiated infrared signal is shifted as described above and the PLL 86 responds by energizing relay K2. The energization of K2 indicates to robot control 40 that the part has been clamped. Robot 28 then releases the workpiece.

With the workpiece in position and the vise clamped, the robot controller 40 may generate a signal to CNC controller 42 causing the index table 16 to move rightwardly and bring the workpiece into position underneath tool 34. After the workpiece has been machined the index table 16 returns leftwardly to its home position and the jaws of the vise are opened. The disengagement of microswitch 44 causes the radiated infrared signal frequency to shift above the center frequency. This is detected by PLL 86 causing relay K2 to de-energize providing an indication to robot controller 40 that the part is unclamped. Robot 28 then may grasp the workpiece, remove it from the vise and carry it to another station for performing other operations on the workpiece if needed. This cycle then is repetitively continued for successive workpieces.

Various modifications to the particular example just described should become evident to those skilled in the art. Therefore, while this invention has been described in connection with one particular example, no limitation is intended thereby except as defined in the following claims.

I claim:

1. In an automated machining system having a movable workpiece holder for holding a workpiece during machining of the workpiece, the improvement comprising:

transducer means for detecting at least one given relative position between the workpiece and the workpiece holder, operative to generate an electrical signal in response to detection of said given position;

transmitter means coupled to the transducer for selectively transmitting an infrared frequency light signal in response to the transducer signal, said transmitter being mounted for movement with the workpiece holder;

remote receiver means for converting said infrared signal into an electrical signal; and means for coupling the signal from said receiver means to a device for controlling an operation on the workpiece.

2. The improvement of claim 1 wherein said machining system includes a machine tool and wherein said workpiece holder is mounted on a movable table, with said transmitter means being mounted for movement with said workpiece holder on the table and said remote receiver means being remotely mounted at a fixed position spaced from the table.

3. The improvement of claim 2 wherein said holder comprises a vise with a pair of automatically controlled opposing jaws for gripping the workpiece.

4. The improvement of claim 3 wherein said transducer means comprises first and second switch means operative to provide electrical signals indicating the position of the workpiece in the vise and the position of the vise jaws, respectively.

5. The improvement of claim 4 wherein said transmitter means further comprises:
means for altering the characteristics of the infrared signal as a function of the output of the switches.

6. The improvement of claim 5 wherein said receiver further comprises:
means for generating a plurality of different electrical signals depending upon the characteristics of the received infrared signal whereby plural machining operational steps may be controlled thereby.

7. The improvement of claim 6 wherein the means in the transmitter is operative to initiate transmission of the infrared signal upon receipt of the electrical signal from the first switch, and wherein said means operates to shift the frequency of the infrared signal in response to an electrical signal from the second switch.

8. The improvement of claim 7 wherein said receiver means is operative to generate a first electrical signal in response to reception of transmission of an infrared signal whereby to provide an indication that the workpiece is in position within the vise, and wherein said receiver is adapted to generate another electrical signal in response to the detection of a given frequency of the infrared signal.

9. The improvement of claim 8 wherein said machining system further includes a robot and an associated controller for transporting the workpiece to and from the vise, with the electrical signals generated by the receiver being used to control robot operation.

10. A machining system comprising:
a machining center having a workpiece holder for securing a workpiece during a machining operation;
robot means for placing a workpiece into the holder and retrieving the workpiece from the holder after work has been performed on the workpiece;
transducer means for detecting at least one given relative position between the workpiece and the holder, operative to generate an electrical signal in response to detection of said given position;
transmitter means coupled to the transducer for transmitting an infrared frequency signal as a function of the transducer signal;
remote receiver means for converting the infrared signal into an electrical and;
means for coupling the electrical signal from the receiver to a device for controlling robot operations on the workpiece.

11. The system of claim 10 wherein said tool holder is adapted to be moved to various positions, with said transmitter being mounted adjacent to the holder and movable therewith.

12. The system of claim 11 wherein said workpiece holder comprises:
a vise with a pair of automatically controlled jaws for selectively gripping the workpiece;
wherein said transducer means comprises first switch means for detecting the presence of the workpiece within the vise and second switch means for detecting the position of the vise jaws; and
wherein said transmitter means is adapted to alter the characteristics of the infrared signal as function of the first and second switch means.

13. The system of claim 12 wherein said transmitter means is operative to initiate transmission of infrared signals when the first switch detects that the workpiece is in the vise, with the frequency of the infrared signal being changed in response to detection by the second switch that the vise jaws are closed about the workpiece.

14. The system of claim 13 wherein said receiver means comprises means for detecting the presence of a received infrared signal and being further operative to detect the relative frequency of said signal whereby the robot may be informed of the presence of a workpiece within the vise and the position of the vise jaws relative to the workpiece.

15. The system of claim 14 which further comprises:
a battery for powering said transmitter, with the first switch being operative to selectively connect the battery to components in the transmitter for creating the infrared signal.

16. The system of claim 15 which further comprises:
timer means in the receiver, operative to be energized during the presence of a received infrared signal whereby the timer provides an indication of battery usage in the transmitter.

17. A method of performing work on a workpiece, said method comprising:
placing the workpiece on a conveyor and transporting the workpiece to a given station;
lifting the workpiece with an automated robot and placing the workpiece in a multi-position workpiece holder;
transmitting an infrared signal to a remotely spaced receiver indicating that the workpiece is in place in the tool holder;
energizing the tool holder to clamp the workpiece in response to the presence of the infrared signal;
transmitting the infrared signal with a selected frequency to indicate that the workpiece holder has clamped the workpiece;
moving the workpiece holder to a station for performing work on the workpiece;
energizing the tool holder to unclamp the workpiece;
altering the frequency characteristics of the infrared signal to indicate that the holder has unclamped the workpiece; and
operating the robot to remove the workpiece from the holder in response thereto.

* * * * *